United States Patent [19]
Foster

[11] 3,803,742
[45] Apr. 16, 1974

[54] MULTIPLE PURPOSE GAME FISH LANDING EQUIPMENT

[76] Inventor: Ray W Foster, 20849 N.E. 116th, Redmond, Wash. 98052

[22] Filed: Oct. 9, 1970

[21] Appl. No.: 79,460

[52] U.S. Cl.............................. 43/4, 43/6, 43/11, 43/23, 43/54.5 R
[51] Int. Cl...................... A01k 77/00, A01k 97/14
[58] Field of Search............ 43/4, 6, 11, 12, 18, 23, 43/25, 25.2, 26, 54.5

[56] References Cited
UNITED STATES PATENTS

| | | | |
|---|---|---|---|
| 1,200,652 | 10/1916 | Samarra................................. | 43/26 |
| 1,520,113 | 12/1924 | Bloom.................................... | 43/23 |
| 1,898,422 | 2/1933 | Champlin............................... | 43/4 |
| 1,927,576 | 9/1933 | Smith..................................... | 43/25 |
| 2,486,163 | 10/1949 | Jennings et al. ....................... | 43/11 |
| 3,150,460 | 9/1964 | Dees ..................................... | 43/4 |
| 3,484,980 | 12/1969 | Wait ..................................... | 43/25.2 |

FOREIGN PATENTS OR APPLICATIONS 8,477  0/1902  Great Britain.......................... 43/12

*Primary Examiner*—Warner H. Camp
*Attorney, Agent, or Firm*—Roy E. Mattern, Jr.

[57] ABSTRACT

In respective embodiments, a gaff hook or a landing net is secured, often removably, to one end of an elongated body which may also serve: as a handle or to support a handle; as a container to receive items used while fishing; as a ruler for measuring the length of fish caught; as a support and receiver of fish gripping devices used in carrying fish; as a support and/or container for a weighing scale; as a mounting place for magnets to hold fish hooks, for a sharpening stone to sharpen fish hooks, and for a cleaning knife, all of which are mounted on a carrying handle which is secured to the elongated body or all or some are mounted directly on the elongated body of the gaff hook and/or the landing net.

1 Claim, 14 Drawing Figures

PATENTED APR 16 1974
3,803,742
SHEET 1 OF 2
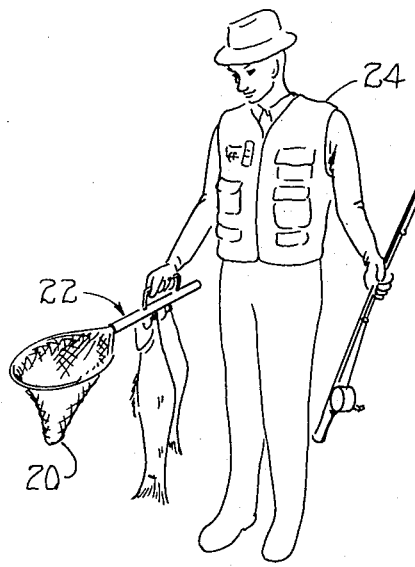
Fig. 1
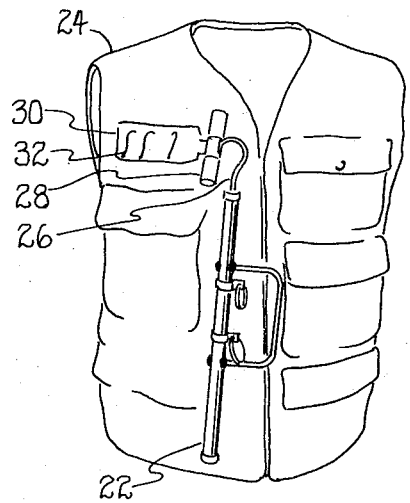
Fig. 2
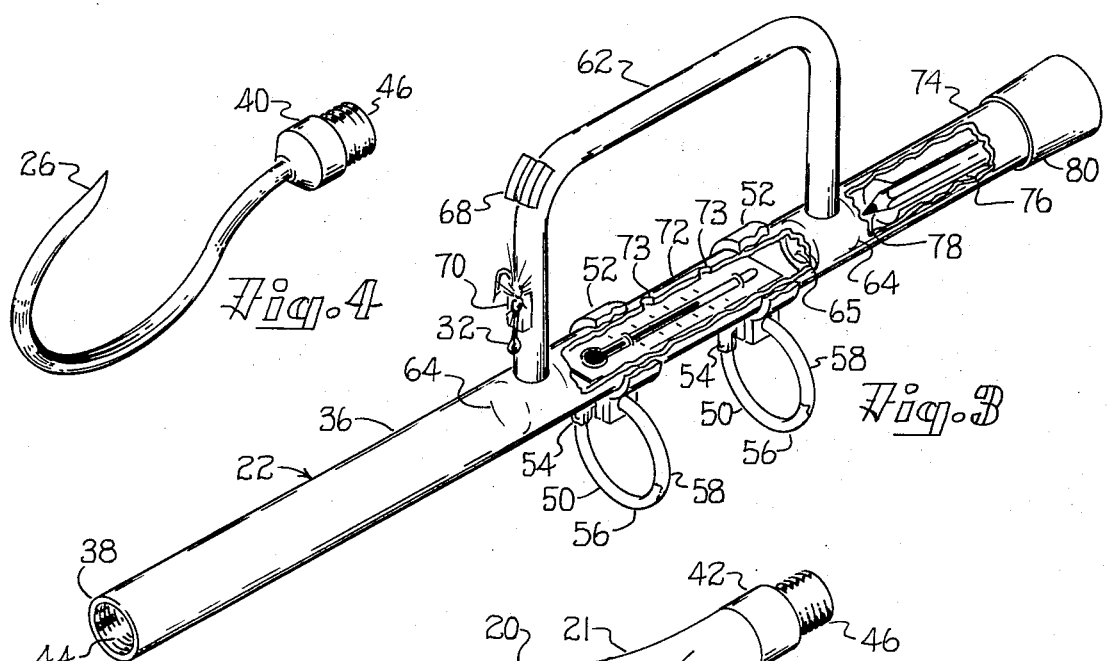
Fig. 4
Fig. 3
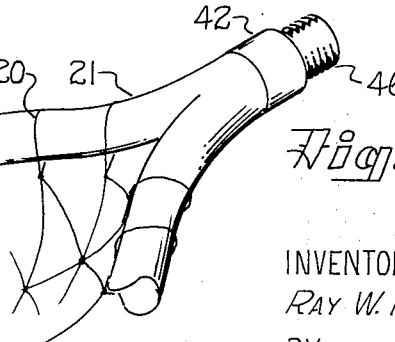
Fig. 5
INVENTOR
RAY W. FOSTER
BY Roy Mattern
ATTORNEY

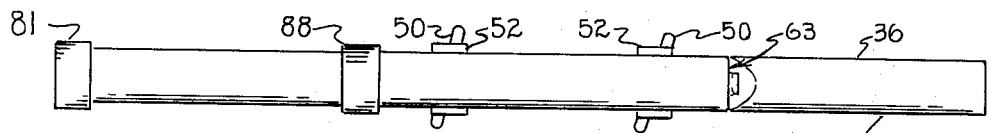
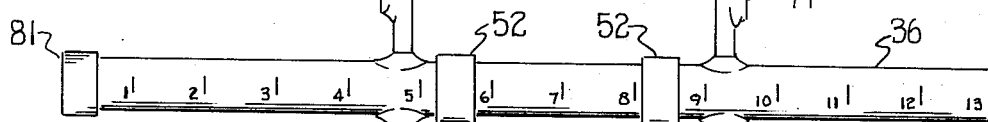
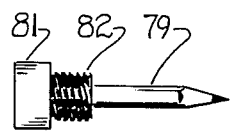
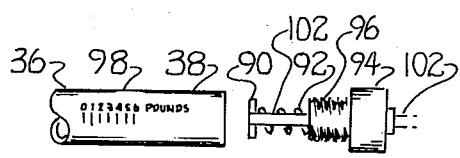
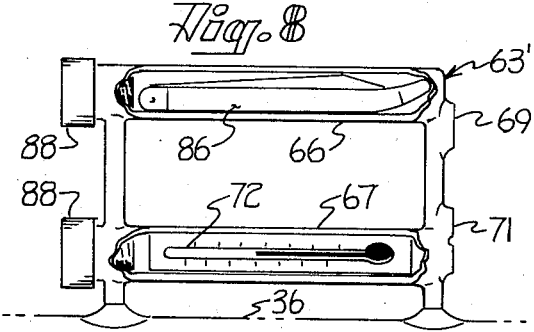
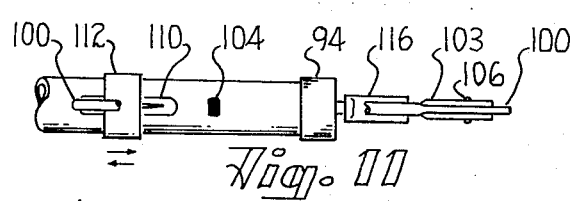
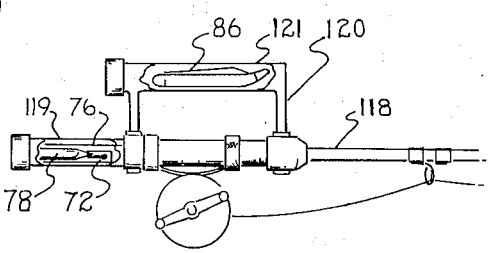
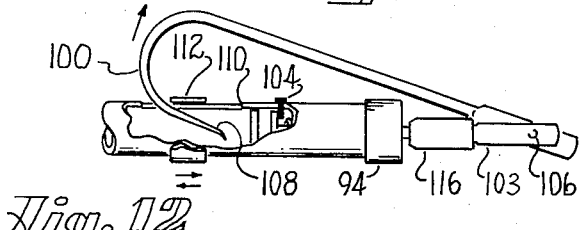
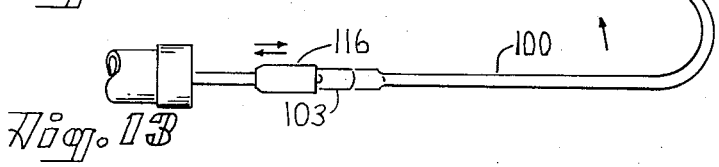
INVENTOR
RAY W. FOSTER
BY
Roy Mattern Jr.
ATTORNEY

MULTIPLE PURPOSE GAME FISH LANDING EQUIPMENT

BACKGROUND OF INVENTION

In the northwestern states sea running steelhead fish upon their return to rivers and streams offer a challenge to the game fisherman. Generally, his access to the rivers and streams is inconvenient and often very difficult and fishing along the river banks and in the stream is likewise often very difficult. He eliminates some of the inconveniences, by using these multiple purpose game fish landing nets and/or gaff hooks. He and those other fisherman using small boats to navigate the rivers and any fisherman, such as a trout fisherman fishing in a remote lake, now have for their use a compact handling unit easily packed along offering to each of them an instantaneous, convenient, ever ready source of all those items so essential to the success of their fishing trip and assuring full compliance with fishing laws and regulations. No previous item or items for fishermen are known to provide such a full complement of equipment to be carried by them as they are actively fishing. They now have a net or a gaff hook, preferably available in a removable either net or hook embodiment, and the associated handling structure for the net or hook is an elongated body to store and to mount various means: to measure, weigh, and support fish; to observe temperatures of air and water; to record information regarding fishing conditions and fish caught; to hold and sharpen hooks; and/or to receive a knife.

SUMMARY OF INVENTION

A game fisherman or any fisherman, and especially those fishing where it is difficult to transport their fishing gear and/or his catch now have for their use a compact handling unit easily packed along, often directly supported from their garments, which itself provides preferably all or selectively many of these cooperative means: a net or gaff hook to land a fish; a rule to measure it, a scale to weigh it; a knife to clean it; lifting devices to carry it and others, a thermometer to record temperatures of water and air; a calendar to observe the date; a pencil or pen and paper to record data regarding fish caught, both to comply with fishing regulations and subsequently to analyze in determining the best fishing times, conditions and places; and holders and sharpening stones for fish hooks.

DESCRIPTION OF DRAWINGS OF PREFERRED EMBODIMENTS

FIG. 1 is a perspective view of the successful fisherman using his multiple purpose game fish landing net to carry the fish he has caught;

FIG. 2 is a perspective view of a fisherman's jacket removably supporting the multiple purpose game fish gaff hook;

FIG. 3 is a perspective view with portions broken away and removed to show the arrangement of components in and on an elongated body of a multiple purpose game fish landing net or gaff hook, including: magnet and sharpening stone for fish hooks, a fish hook; a thermometer, threaded end to receive a net or gaff hook;

FIG. 4 is a perspective view of a gaff hook to be removably secured to the elongated body of the multiple purpose game fish landing net or gaff hook, as shown in FIG. 3;

FIG. 5 is a partial perspective view of a net to be removably secured to the elongated body of the multiple purpose game fish landing net or gaff hook, as shown in FIG. 3;

FIG. 6 is a partial top view of an elongated body illustrating a threaded plug end, an upright handle having a compartment, sleeve-ring supports for fish, and measurement markings;

FIG. 7 is a partial side view of an elongated body showing a threaded plug end, sleeve-ring supports for fish, measurement markings, an upright handle having a compartment for a knife, a magnet to hold fish hooks, and a stone for sharpening fish hooks;

FIG. 8 is a partial side view, with portions removed, of an upright handle having compartments for a knife and a thermometer;

FIG. 9 is a side view of a threaded plug end having a pencil removably secured to it for convenient handling and then storage within a hollow end portion of the elongated body;

FIG. 10 is a side view of portions of a fish weighing scale installed at the end of the elongated body and its connection to the shank of a gaff hook;

FIG. 11 is a partial top view, with portions removed, to show how a gaff hook is safely stored when not in use, a ring being slidably positioned to retain or to release the gaff hook end with respect to the interior of the elongated body;

FIG. 12 is a partial side view, with portions removed, to further illustrate the holding and release of the gaff hook end with respect to the interior of the elongated body;

FIG. 13 is a partial side view of the retractable gaff hook secured in its use position; and FIG. 14 is a partial view, indicating how some of the components may optionally be included within structures of handles of fishing poles.

DESCRIPTION OF PREFERRED EMBODIMENTS

Handling Features

FIG. 1 illustrates how the successful fisherman uses the net, 20, embodiment of this multiple purpose game fish landing equipment 22 to carry his fish. In getting to the fishing locale he conveniently carries it, 22, or supports it, 22, from his fishing garment 24, as suggested in FIG. 2, with respect to gaff hook, 26, embodiment. The sharp end of gaff hook 26 is fitted into a recess or interior of a receiver 28 which in turn is attached to garment 24 along with a soft pad 30 to receive fish hooks 32 and other fishing gear.

Gaff Hook or Net Option

One preferred embodiment of this multiple purpose game fish landing equipment 22, having a removable gaff hook 26 and/or net 20 and its frame 21, is illustrated in FIGS. 3, 4, and 5. It has an elongated body 36, threaded at one end 38 to optionally receive either gaff hook 26 or net frame 21, each of which has a threaded end 40, 42, utilizing the respective internal threads 44 and external threads 46.

Carrying Fish

As illustrated in FIGS. 1 and 3, rings 50 are positioned on circular slides 52 which in turn are supported on elongated body 36. Each ring 50 is hinged 54 to open and be passed through some portion of a fish and then snapped together using interlocking ring ends 56, 58. Depending on the number of fish caught and their respective weights, circular slides 52 and rings 50 will be moved until a reasonable balance is obtained in carrying fish, as indicated in FIG. 1. Preferably a raised U shaped handle 62 is secured with collar reinforcements 64 to elongated body 36 to accommodate a fisherman's bare hand or gloved hand.

Sharpening and Carrying Fish Hooks

A sharpening stone 68 is provided on handle 62 to be used in sharpening ends of fish hooks 32. Also a magnet 70 is provided on handle 62 to receive spare fish hooks 32, as shown in FIG. 3.

Temperature Observations

Also, as shown in FIG. 3, a thermometer 72 is installed within elongated body 36 to give a reading of air temperature, and, when submerged, to give a reading of water temperature. Both temperatures are observed and often recorded in analyzing when the best fishing should occur, did occur, and/or should occur again. Openings 73 and seals 65 control entry of water about thermometer 72.

Keeping Records of Fish Caught and Related Data

Fishing regulations often require the fisherman to keep a punch card or other card with him. Also data must often be entered as to sizes and kinds of fish caught, and places where fish were caught, and dates when they were caught. Also a fisherman may wish to record additional data, such as the temperatures of air and water, the hour of the day, and the lure and/or bait used. Therefore, as illustrated in FIG. 3, a hollow end 74 of elongated body 36 is provided to receive, for example, a calendar 76, a pencil 78, and other items not shown such as a punch card and recording paper. They are retained in place by a removable end cap 80.

Measuring the Fish

As indicated in FIGS. 6 and 7, measurement indicia 84, such as inch recordings, are provided along elongated body 36 to be used in determining the length of the fish that are caught.

Availability of a Knife in a Handle

A handle 63 is shown in FIGS. 6 and 7, formed to receive a fisherman's hand, outside, yet to receive a fisherman's knife 86 inside compartment 66. A threaded end cap 88 retains knife 86 in place. This handle embodiment also includes a sharpening stone 69 and a magnet 71.

Availability of a Knife and Thermometer in a Handle

A handle 63' is shown in FIG. 8 formed with two compartments 66, 67, respectively receiving a knife 86 and thermometer 72.

Availability of a Pencil

A pencil 79 is frictionally retained within a threaded plug housing 82 of an end cap 81, as illustrated in FIG. 9, and it is handled more conveniently during use, after its removal from an elongated body 36, as illustrated in FIGS. 6 and 7.

Availability of a Weight Scale

As indicated in FIG. 10, a coil spring 90 weight scale mechanism 92 is non rotatably but slidably and restrictively included in an end cap 94 and its threaded housing 96, for incorporation into end 38 of an elongated body 36, which in this location is hollow and clear and inscribed with weight indicia 98, such as pounds and ounces.

Gaff Hook for Dual Use with Weight Scale

A regular gaff hook 26 is securable to end cap 94 using its shank 102. However, a retractable gaff hook 100 having a forked shank 103 is also securable to end cap 94, as illustrated in FIGS. 11, 12 and 13. Whichever gaff hook, 26 or 100, is used with a coiled spring weight scale mechanism 92, a lock out key 104 is inserted during gaffing of a fish and other times to make coil spring 90 ineffective until weighing of a fish is subsequently undertaken. In lieu of lock out key 104, transverse retractable spring biased means, not shown, are used.

Upon pivoting about its hinge pin 106, retractable gaff hook 100 rotates until its sharp end 108 enters through slot 110 into the hollow interior of end 38 of elongated body 36. Slidable keeper ring 112 is then moved over part of slot 110 to keep the sharp end 108 within the interior of elongated body 36 until it is needed again for gaffing and/or weighing a fish. When so needed, after it is pivoted into place, slidable rectangular locking sleeve 116 is moved, over the forked shank 103 of gaff hook 100, as illustrated in FIGS. 12 and 13, to hold retractable gaff hook 100 firmly in place and ready for gaffing and/or weighing.

Placement of Some Components in Handle of a Fishing Pole

Although most components are conveniently fitted to this multiple purpose game fishing landing net or gaff hook, some fishermen find it desirable to include some components in the hollow handles of their fishing poles. As illustrated in FIG. 14, a fishing pole handle 118, contains a thermometer 72, a calendar 76, and a pencil 78. In addition to utilizing this storage space 119, or, if the regular handle is solid, then an upright handle 120 is included having its space 121 for a knife 86 or other items.

SUMMARY OF ADVANTAGES

A fisherman having his multiple purpose game fish landing net and/or gaff hook, equipped as illustrated and described in a selected embodiment of his choice, conveniently carries with him all the equipment and accessories he needs, over and above his pole, reel and line, for a limited period of time of lake and/or stream fishing. With a fish hooked and fighting, he is ready to play and then land it. After it is successfully caught he is ready to measure, weigh and secure the fish. Moreover, to comply with regulations he is able to record data concerning the catch. In addition he is ready to observe temperatures and record them for future reference. Then, as necessary, cleaning of the fish may be undertaken when he carries his knife in one of the compartments.

I claim:

1. A multiple purpose game fish landing equipment sized overall to be suspended conveniently on the front of a fisherman's vest, comprising:
   a. an elongated hollow body;
   b. a full hand U-shaped gripping handle secured centrally on the top of the elongated hollow body, resulting in the balanced horizontal lifting of this body;
   c. a game fish capture unit secured to the leading end of the elongated hollow body and sealing this hollow end, thereby providing a capture unit to further secure a fish already caught on a hook of a fishing line;
   d. a removable sealable cover secured to the trailing end of the elongated hollow body thereby making the interior of this body a receiving space for the carrying of important items such as a thermometer, pencil and fish punch card which are all used during active successful fishing especially of a stream; and
   e. two fish supporting ring assemblies slidably secured to the elongated hollow body directly below the U-shaped full hand gripping handle secured centrally on the top of the elongated hollow body, each of these assemblies having a sliding sleeve with a depending portion thereof formed with a central hole, and an openable and closable ring fitted through the central hole of the depending portion of each sliding sleeve, and also when a fish is to be carried, fitted through the gill portions of a fish, and when one fish is carried, one fish supporting ring assembly is positioned below the center of the full hand U-shaped gripping handle and when two fish are carried, one fish supporting ring assembly is positioned, respectively adjacent each location where this U-shaped handle is secured to the elongated hollow body, thereby balancing the hand carrying load of two fish.

* * * * *